United States Patent
Sanneck et al.

(10) Patent No.: US 10,681,566 B2
(45) Date of Patent: Jun. 9, 2020

(54) SCORING METHOD AND SYSTEM FOR ROBUST VERIFICATION OF CONFIGURATION ACTIONS

(71) Applicant: NOKIA SOLUTIONS AND NETWORKS OY, Espoo (FI)

(72) Inventors: Henning Sanneck, Munich (DE); Szabolcs Novaczki, Budapest (HU); Tsvetko Ivanchev Tsvetkov, Garching (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 275 days.

(21) Appl. No.: 15/509,363

(22) PCT Filed: Sep. 8, 2014

(86) PCT No.: PCT/EP2014/069096
§ 371 (c)(1),
(2) Date: Mar. 7, 2017

(87) PCT Pub. No.: WO2016/037637
PCT Pub. Date: Mar. 17, 2016

(65) Prior Publication Data
US 2017/0265089 A1 Sep. 14, 2017

(51) Int. Cl.
*H04W 24/02* (2009.01)
*H04L 12/24* (2006.01)
(Continued)

(52) U.S. Cl.
CPC ......... *H04W 24/02* (2013.01); *H04L 41/0863* (2013.01); *H04L 41/0869* (2013.01); *H04W 24/08* (2013.01); *H04W 84/18* (2013.01)

(58) Field of Classification Search
CPC ..... H04W 24/02; H04W 24/08; H04W 84/18; H04L 41/0863; H04L 41/0869
(Continued)

(56) References Cited

U.S. PATENT DOCUMENTS 10,200,234 B2 * 2/2019 Tang ............... H04L 41/044
10,367,690 B2 * 7/2019 Sanneck ........... H04L 41/0813
(Continued)

FOREIGN PATENT DOCUMENTS

CN 101877871 A 11/2010
CN 103227995 A 7/2013
(Continued)

OTHER PUBLICATIONS

Jun. 18, 2018 Office Action issued in Japanese Patent Application No. 2017-531960.
(Continued)

*Primary Examiner* — James E Springer
(74) *Attorney, Agent, or Firm* — Squire Patton Boggs (US) LLP

(57) ABSTRACT

There are provided measures for verification of configuration actions. Such measures exemplarily comprise detecting a configuration change in a domain, said configuration change comprises at least one parameter change, and said domain comprises at least one cell, repeating, for a predetermined period, an assessment cycle, and deciding, for each respective parameter change of said at least one parameter change, whether said respective parameter change is to be undone, based on a performance change of each cell of said domain which cell is affected by said respective parameter change, wherein said assessment cycle comprises assessing said performance change of each cell of said domain which cell is affected by any of said at least one parameter change.

15 Claims, 11 Drawing Sheets

(51) Int. Cl.
*H04W 24/08* (2009.01)
*H04W 84/18* (2009.01)

(58) Field of Classification Search
USPC ........................................................ 709/221
See application file for complete search history.

(56) References Cited

U.S. PATENT DOCUMENTS

| | | | |
|---|---|---|---|
| 2008/0310320 A1* | 12/2008 | Kim ................ | H04L 41/0863 370/252 |
| 2011/0051616 A1 | 3/2011 | Inada et al. | |
| 2012/0295609 A1* | 11/2012 | Li .................... | H04W 24/04 455/423 |
| 2013/0324076 A1 | 12/2013 | Harrang | |
| 2014/0113676 A1* | 4/2014 | Hamalainen ........ | H04W 72/046 455/522 |
| 2014/0315539 A1 | 10/2014 | Kobayashi et al. | |
| 2015/0281017 A1* | 10/2015 | Sarkar ................ | H04L 43/08 370/252 |
| 2015/0365954 A1* | 12/2015 | Levine .............. | H04W 72/06 455/450 |
| 2016/0157126 A1* | 6/2016 | Nuss ................. | H04W 28/08 370/230 |
| 2017/0026852 A1* | 1/2017 | Jalden ............... | H01Q 3/005 |

FOREIGN PATENT DOCUMENTS

| | | |
|---|---|---|
| CN | 103580898 A | 2/2014 |
| JP | 2011-55060 A | 3/2011 |
| JP | 2013516872 A | 5/2013 |
| WO | 2012/053240 A1 | 4/2012 |
| WO | 2013046502 A1 | 4/2013 |
| WO | 2013089058 A1 | 6/2013 |
| WO | 2013113266 A1 | 8/2013 |
| WO | WO 2013/144950 A1 | 10/2013 |
| WO | 2013184719 A1 | 12/2013 |
| WO | 2014198310 A1 | 12/2014 |
| WO | 2015165525 A1 | 11/2015 |

OTHER PUBLICATIONS

Tobias Bandh, Coordination of autonomic function execution in Self-Organizing Networks, Technische Universität München (TUM); Apr. 2013.

Raphael Romeikat et al, Efficient, Dynamic Coordination of Request Batches in C-SON Systems, IEEE International Workshop on Self-Organising Networks, 2013.

Seppo Hamalainen et al, LTE Self-Organising Networks (SON)—Network Management Automation for Operational Efficiency, Wiley 2012.

Ericsson White Paper, Transparent Network-Performance Verification for LTE Rollouts, Sep. 2012.

Tsvetko Tsvetkov et al, An Experimental System for SON Verification, IEEE International Workshop on Self-Organising Networks; 2014.

Varun Chandola et al, Anomaly Detection: A Survey, ACM Computing Surveys (CSUR), vol. 41, pp. 15:1-15:58, Jul. 2009.

International Search Report and Written Opinion dated May 11, 2015 corresponding to International Patent Application No. PCT/EP2014/069096.

Japanese Office Action issued in corresponding Japanese Patent Appln. No. 2017-531960 dated Feb. 12, 2019.

Chinese Office Action corresponding to CN Appln. No. 201480083256.1, dated Aug. 19, 2019.

European Communication pursuant to Article 94(3) EPC corresponding to EP Appln. No. 14 761 636.1, dated Jan. 15, 2020.

Japanese Appeal Decision of Rejection corresponding to JP Appln. No. 2017-531960, dated Jan. 20, 2020.

* cited by examiner

SCORING METHOD AND SYSTEM FOR ROBUST VERIFICATION OF CONFIGURATION ACTIONS

FIELD

The present invention relates to verification of configuration actions in relation to self-organizing networks. More specifically, the present invention exemplarily relates to measures (including methods, apparatuses and computer program products) for realizing verification of configuration actions in relation to self-organizing networks.

BACKGROUND

The present specification generally relates to verification of configuration actions in particular in self-optimizing networks and more specifically relates to post-action verification in self-organizing networks.

Self-organizing network (SON) features are seen today as the key enablers for automated network management in next generation mobile communication networks such as Long Term Evolution (LTE) and LTE-Advanced (LTE-A). SON features can be grouped into three main areas: self-configuration, self-optimization and self-healing.

The first area, i.e. self-configuration, typically focuses on the initial configuration and auto-connectivity of newly deployed network elements (NE).

The second area, i.e. self-optimization, targets the optimal operation of the network. A network enabled for self-optimization automatically adapts configuration parameters which should lead to improved robustness, reliability and throughput.

The third area, i.e. self-healing, is responsible for fault detection and resolution, e.g., caused by malfunctioning hardware or faulty software.

These three core functionalities are available through the use of so-called SON functions. Such functions are designed to work independently from each other.

In order to fulfill their tasks the SON functions monitor certain key performance indicators (KPI), configuration changes and alarm occurrences in the network.

After gathering the required amount of information, a SON function instance may get active (i.e., run its algorithm) in order to compute new configuration management (CM) parameters and enforce them on the NEs requiring reconfiguration.

Due to the fact that SON function instances may perform changes to network configuration parameters during their operation, a SON coordinator is required to reject the requests which would cause or engage in conflicts and allow those, which would guarantee a flawless network operation.

These approved requests will trigger the actual configuration of their corresponding network parameters. This type of coordination is usually referred to as pre-action SON coordination and is based on rules used to anticipate and avoid known conflicts between SON function instances.

In addition, there are two important properties of a SON function instance required for coordination: the impact time and impact area.

A SON function instance has to be considered by a SON coordinator during the complete time period during which it is active. This time period is also known as the impact time. This time period includes not only the delay required to perform measurements, run the algorithm and compute new configuration parameters, but also the time required to deploy the new configurations and the time until they become relevant for subsequently active functions.

The impact area is the spatial scope (at the cell level) within which a SON function instance modifies configuration parameters or takes measurements. More precisely, it contains the function area (area that is directly configured), the input area (area where the measurements are taken from), the effect area (the area that contains the cells that are affected by a CM change), and a safety margin (an extension to the effect area).

However, approved network configuration changes may not necessarily lead to improved performance targeted by the corresponding network functions and, even more so for the network-wide performance defined by operator specific criteria.

This is caused by the fact that the SON coordinator focuses only on the conflict detection and coordination. An operator may, therefore, compensate this by adding a post-action verification mechanism to determine whether a configuration change leads to a significant change in performance. It aims at computing statistical measures on performance indicators at a relevant spatial and temporal aggregation level to assess quickly the impact of a set of (SON-induced) configuration changes. This may be done independently of the semantics of those configuration changes such that also performance impacts with unknown causes can be identified. The approach can be classified as a specific type of anomaly detection.

FIG. 3 outlines the integration of a verification mechanism as discussed above. In particular, FIG. 3 gives an overview of the above discussed SON operation entities (management, coordination, verification) in a SON-enabled network. The mechanism is implemented as a SON function (the SON verification function 31C) which is seeded with CM, Performance Management (PM) and Fault Management (FM) data 319 from the corresponding databases (CM database 37, PM database 38) and the FM 39 in order to achieve its task.

As soon as enough data is collected, the SON verification function 31C tries to determine whether the network experiences performance degradation. If this is the case, it sends an undo execution request 311 to the SON coordinator 32 and reverts 318 the CM changes of the affected cells made by a given SON function instance 31A, 31B after receiving the corresponding acknowledgement 312.

As FIG. 3 depicts, a human operator (via SON management 33) is always informed about the current state of the CM parameters, KPIs as well as fault occurrences in the network. The operator is also able to manually adjust (300) CM parameters.

However, the SON verification function 31C becomes useful only when it is known when and where to apply it. For this reason, the SON verification function 31C identifies the cell or a set of cells affected by a (set of) CM change(s).

To do so, the SON verification function 31C computes a verification area which is the spatial scope that is observed for anomalies. It consists of a set of cells ("CM change base area") that have been reconfigured by SON function instances 31A, 31B and a set of cells ("CM change extension area") that have been possibly influenced by that reconfiguration process.

In addition to the above mentioned entities the SON environment shown in FIG. 3 further comprises the following arrangement.

SON functions 31 may consist of several SON functions, e.g. SON function A (31A) and SON function B (31B), each implementing a respective SON function algorithm (SON function algorithm A (31Aa), SON function algorithm B (31Ba)).

The SON verification function 31C, which is also a SON function 31, implements a verification algorithm 31Ca.

The SON management 33 may configure the SON functions 31 via respective configurations, e.g., verification function configuration 313, a function B configuration 314, and a function A configuration 315.

The SON management 33 may further configure the SON coordinator 32 via a coordination configuration 310.

CM configurations (e.g. CM configuration A 316 and CM configuration B 317) are transmitted to a plan assembly 34, where the respective configurations are forwarded to and implemented at respective evolved NodeBs (eNB, eNodeB), e.g. eNodeB A (35) and eNodeB B (36), serving cells 35A to 35C and 36A to 36C, respectively.

Execution requests 311 and execution permissions 312 are interchanged between the SON functions 31 and the SON coordinator 32.

In view of the above, a verification mechanism is known to be implemented as a SON function. The main reason for proposing such a function is to solve the issues caused by uncoordinated CM undo operations. The verification scope may be defined e.g. as all cells controlled by a certain controller such as a base station controller (BSC) or a radio network controller (RNC).

A known verification function includes four major phases which are depicted in FIG. 4, which, in other words, illustrates a general overview of such verification.

The mentioned phases are a CM change activity observer 41, a verification area generation 42, a performance assessment 43, as well as a decision (44) to accept (44A, "PASSED") or undo (44B, "FAILED") the CM changes (made by a human operator, a script, a given SON function instance or any other source).

The following problems arise when implementing the known verification of configuration actions approach.

One problem is very basic in that according to known techniques the phase 43 is done once followed by an immediate decision 44. While this behavior leads to a fast undo 44B, the assessment 43 and thus the decision 44 are very sensitive to short-term perturbations of the system, and thus the decision 44, whether a (set of) configuration changes leads to a good or bad result may be not at all reliable.

FIG. 5 illustrates multiple CM changes made by a single SON function instance and is used to describe a further problem of the known verification of configuration actions approach.

For description, a SON function instance A is supposed, whose function area 51 includes not just one cell, but, e.g., all cells of an eNodeB 52 (e.g. cell 1 (53), cell 2 (55) and cell 3 (54). It is further supposed that this SON function A changes two parameters at two of the cells (namely, changes parameter "X" at cell 1 (53A), and changes parameter "Y" at cell 2 (55A)).

In case one of those changes induces degradation in performance, the known verification function will undo all changes within the CM changes base area (which equals the function area 51 as known from above). As a consequence, the changes made at cell 1 (53) as well as cell 2 (55) will be undone even if one of them has had a positive impact on the network performance.

A still further problem is that the known technique is not able to prevent SON function instance A from redoing the harmful change (i.e. the change with the bad result) over and over again. If the above mentioned SON coordinator would be used to block the request of SON function instance A, it would lead to the blocking of all requested CM changes, even those that might have a positive effect on the network. If we take the notation introduced in FIG. 5, changes "X" (53A) and "Y" (55A) will be blocked even if one of them improved the performance and was, therefore, necessary.

The main reason for this to happen is that SON function instances are not informed about the impact of their changes and are in no position to filter their requests before sending them to the SON coordinator.

It should be noted that X and Y above can refer to both a change of the same or different parameter types. There are SON functions, e.g., a capacity and coverage optimization (CCO) function, which have the ability to change two different CM parameters (e.g., the transmission power and the antenna tilt in case of the CCO function).

Hence, the problem arises that merely an ineffective verification of configuration actions approach is known, according to which the decision, whether a configuration change leads to a good or bad result may be not at all reliable, changes may be undone even if one of them has had a positive impact on the network performance, and a according to which configuration change that leads to a bad result can be repeatedly set.

Hence, there is a need to provide for verification of configuration actions.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method for post-action verification in a self-organizing network, comprising detecting a configuration change in a domain, said configuration change comprises at least one parameter change, and said domain comprises at least one cell, repeating, for a predetermined period, an assessment cycle, and deciding, for each respective parameter change of said at least one parameter change, whether said respective parameter change is to be undone, based on a performance change of each cell of said domain which cell is affected by said respective parameter change, wherein said assessment cycle comprises assessing said performance change of each cell of said domain which cell is affected by any of said at least one parameter change.

According to an exemplary aspect of the present invention, there is provided a system for post-action verification in a self-organizing network, comprising a configuration change device configured to implement a configuration change in a domain, said configuration change comprises at least one parameter change, and said domain comprises at least one cell, and a verification device including a detecting element configured to detect said configuration change, an assessing element configured to, during an assessment cycle repeated for a predetermined period, assess a performance change of each cell of said domain which cell is affected by any of said at least one parameter change, and a deciding element connected to said assessing element and configured to decide, for each respective parameter change of said at least one parameter change, whether said respective parameter change is to be undone, based on said performance change of each cell of said domain which cell is affected by said respective parameter change.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient post-action verification of configuration actions to thereby solve at least part of the problems and drawbacks identified in relation to the prior art.

In particular, according to exemplary embodiments of the present invention, robust undo decisions (CM change assessor) can be made.

The granularity of a CM undo operation of current verification approaches reverts all CM changes made by a single CM entity (e.g., a SON function instance), if a degradation caused due to the activity of that function is detected. That is, if only a single CM change made by a SON function instance causes some network anomalies (e.g., degradation in performance), the SON verification function will undo all changes within the corresponding function area. As a consequence, appropriate and positive CM changes (i.e., such having a positive impact on the network) will be undone as well.

To the contrary, according to exemplary embodiments of the present invention, such behavior is prevented from happening. By introducing a scoring mechanism for individual CM changes and rating them based on their influence on the network, a dependency on the amount of CM changes a single SON function instance is requesting is dissolved.

The CM change assessor according to exemplary embodiments of the present invention generates information for each assessment cycle how positive or negative each CM change (and/or a given set of CM changes) actually was, and hence the actual undo decision can be done after several assessment cycles when some convergence of the assessment is given. This improves the robustness of the undo decision (traded off against some delay required to take the decision).

Optionally, the scoring listener(s) according to exemplary embodiments of the present invention receive the (aggregated) feedback. Based on this information, it/they can filter CM change requests and improve its/their decisions over time.

Further, according to exemplary embodiments of the present invention, flexible granularity for the scope of the undo decision is enabled, such that of undoing all changes in a given scope (CM change assessor) is prevented.

The CM change assessor according to exemplary embodiments of the present invention generates information for each assessment cycle how positive or negative each individual CM change was and hence even individual CM changes can be undone. Here, the ability to aggregate assessments from several cycles adds the needed information (by looking at history/trends).

Furthermore, according to exemplary embodiments of the present invention, it can be avoided to redo harmful changes over and over again (optional scoring listener(s)).

By splitting CM scoring mechanism into two parts, namely the CM change assessor according to the present invention and the score listener according to the present invention, and distributing the latter one to every SON function instance, the proposed technique is capable of preventing inappropriate and harmful CM changes from occurring over and over again. By continuously rating CM changes triggered by the running SON function instances and sending the scores to them, each instance is able to filter its CM change request even before it is sent to the SON coordinator.

Since SON function instances might be located directly at the NE-level, they do not have an overall view on the corresponding domain. That is, such a function instance does not know how its changes influence others out of its scope.

However, by being supplied with scores by the CM change assessor of the SON verification function according to the present invention they are capable of doing so.

By way of exemplary embodiments of the present invention, there is provided verification of configuration actions. More specifically, by way of exemplary embodiments of the present invention, there are provided measures and mechanisms for realizing verification of configuration actions.

Thus, improvement is achieved by methods, apparatuses and computer program products enabling/realizing verification of configuration actions.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a self-organizing network is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) verification of configuration actions.

While above the background of the invention has been described for a SON-enabled system, a verification function can work in an independent way on configuration changes induced by any source (human operator, CM scripts, offline optimization, etc.) rather than only in a SON environment.

Figure 1:
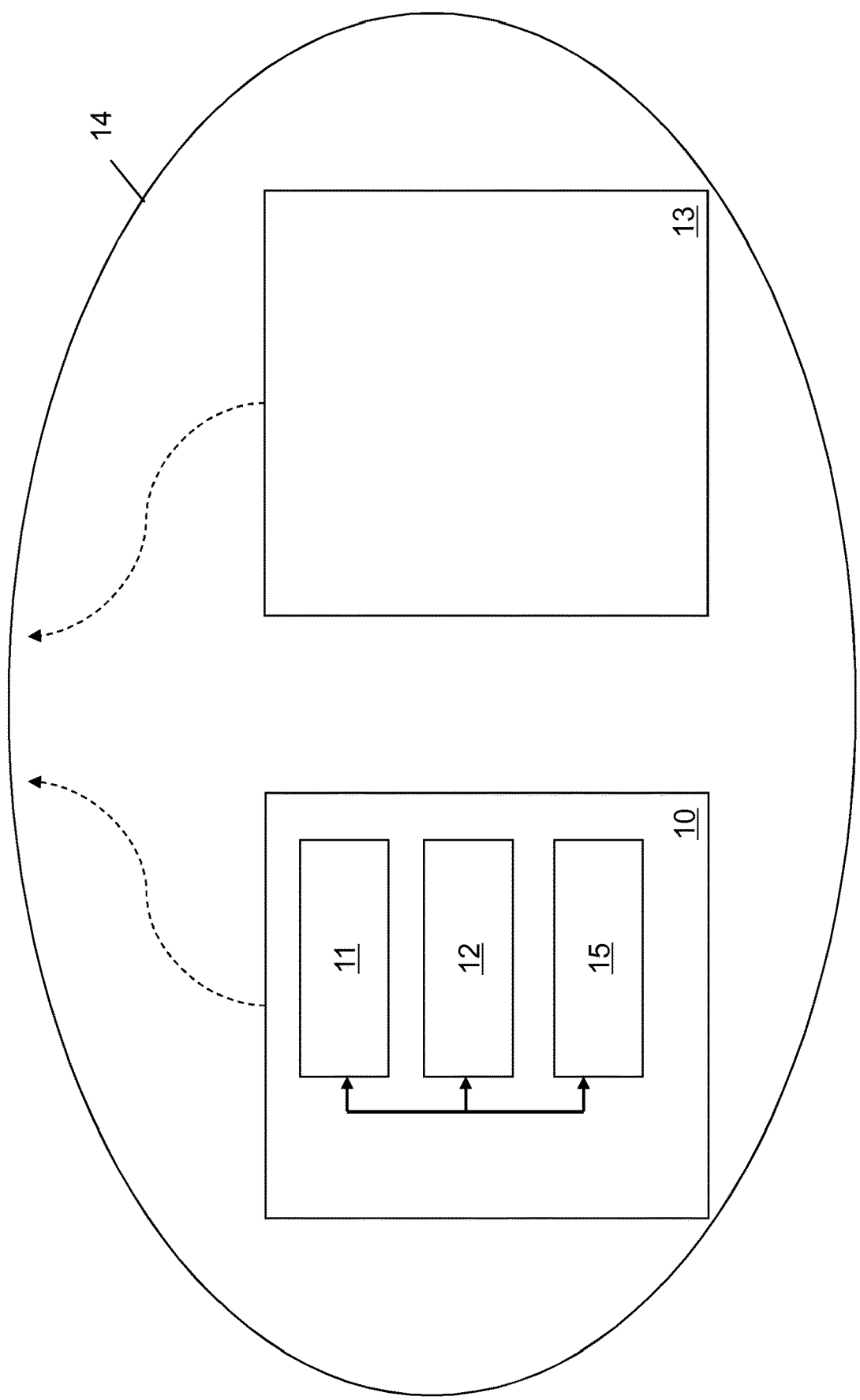
FIG. 1 is a block diagram illustrating a system according to exemplary embodiments of the present invention.

FIG. 1 is a block diagram illustrating a system for post-action verification in a self-organizing network 14 according to exemplary embodiments of the present invention. The system according to exemplary embodiments of the present invention may comprise a configuration change device 13 configured to implement a configuration change in a domain, said configuration change comprises at least one parameter change, and said domain comprises at least one cell, and a verification device 10. The configuration change device 13 and the verification device 10 are connected to the SON 14 and able to communicate with the SON 14. The verification device 10 may include a detecting element 11 configured to detect said configuration change, an assessing element 12 configured to, during an assessment cycle repeated for a predetermined period, assess a performance change of each cell of said domain which cell is affected by any of said at least one parameter change, and a deciding element 15 connected to said assessing element 12 and configured to decide, for each respective parameter change of said at least one parameter change, whether said respective parameter change is to be undone, based on said performance change of each cell of said domain which cell is affected by said respective parameter change.

According to a variation of the system shown in FIG. 1, the system further comprises a coordinator device connected to said verification device 10. The verification device 10 further comprises a communication element, wherein said communication element is configured to transmit, to said coordinator device, an undo request for undoing a respective parameter change of said at least one parameter change, if it is decided that said respective parameter change is to be undone, said communication element is further configured to receive, from said coordinator device, an undo permission response for undoing said respective parameter change, and wherein said verification device 10 is further configured to implement an undoing of said respective parameter change.

According to a variation of the system shown in FIG. 1 the system further comprises a score listener device connected to said verification device 10, wherein the verification device 10 is further configured to transmit, for each respective parameter change of said at least one parameter change, an assessment score determined based on said performance change during said assessment cycle repeated for said predetermined period to said score listener device.

According to a variation of the system shown in FIG. 1, the score listener device comprises a receiving element configured to receive at least one of said transmitted assessment scores for a respective parameter change of said at least one parameter change, and an adjusting element connected to said receiving element and configured to adjust a configuration change filter based on said received at least one of said assessment scores.

According to a variation of the system shown in FIG. 1 the score listener device further comprises a setting element connected to said adjusting element and configured to set said configuration change filter to forward a received parameter change for which a positive assessment score is received, and to set said configuration change filter to block a received parameter change for which a negative assessment score is received.

According to a variation of the system shown in FIG. 1 the system further comprises a management device connected to said configuration change device 13 and to said verification device 10 and configured to manage said configuration change device and said verification device.

According to a variation of the system shown in FIG. 1 the configuration change device 13 and said verification device 10 are respectively implemented by a self-optimizing network function.

According to a variation of the system shown in FIG. 1 the score listener device is implemented as part of said configuration change device 13.

Figure 2:
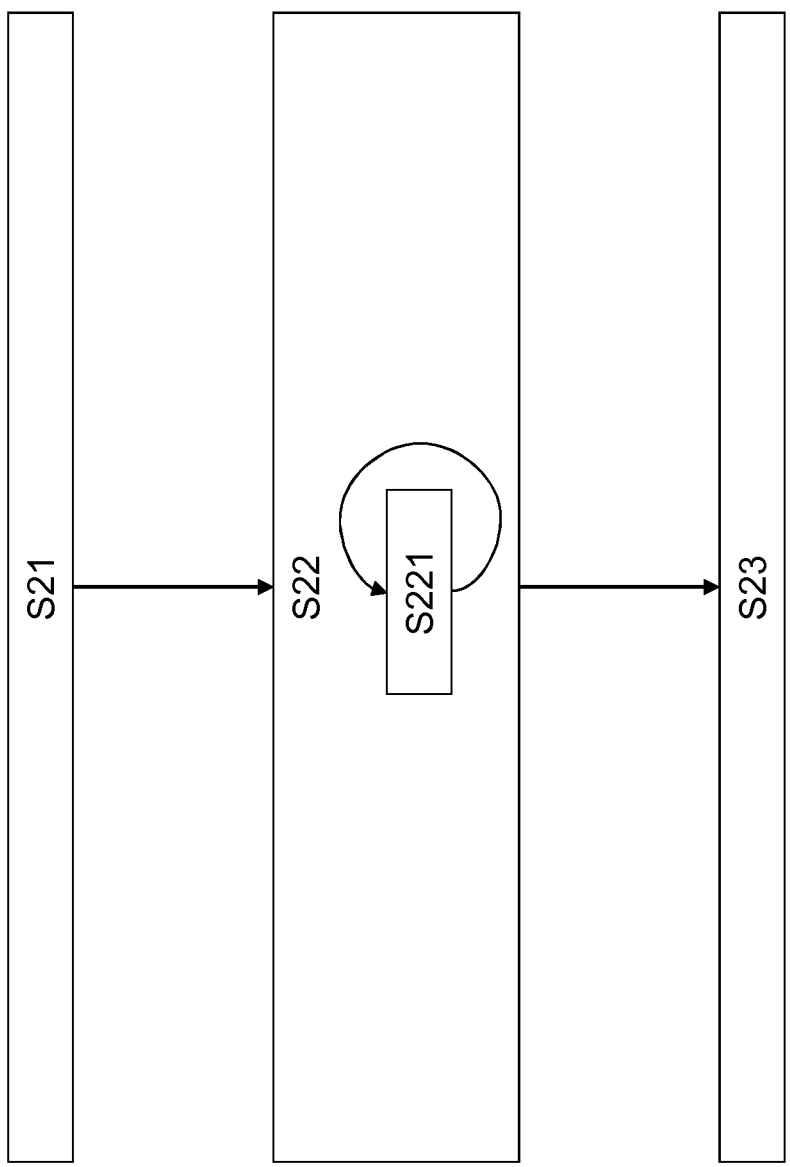
FIG. 2 is a schematic diagram of a procedure according to exemplary embodiments of the present invention.
Figure 3:
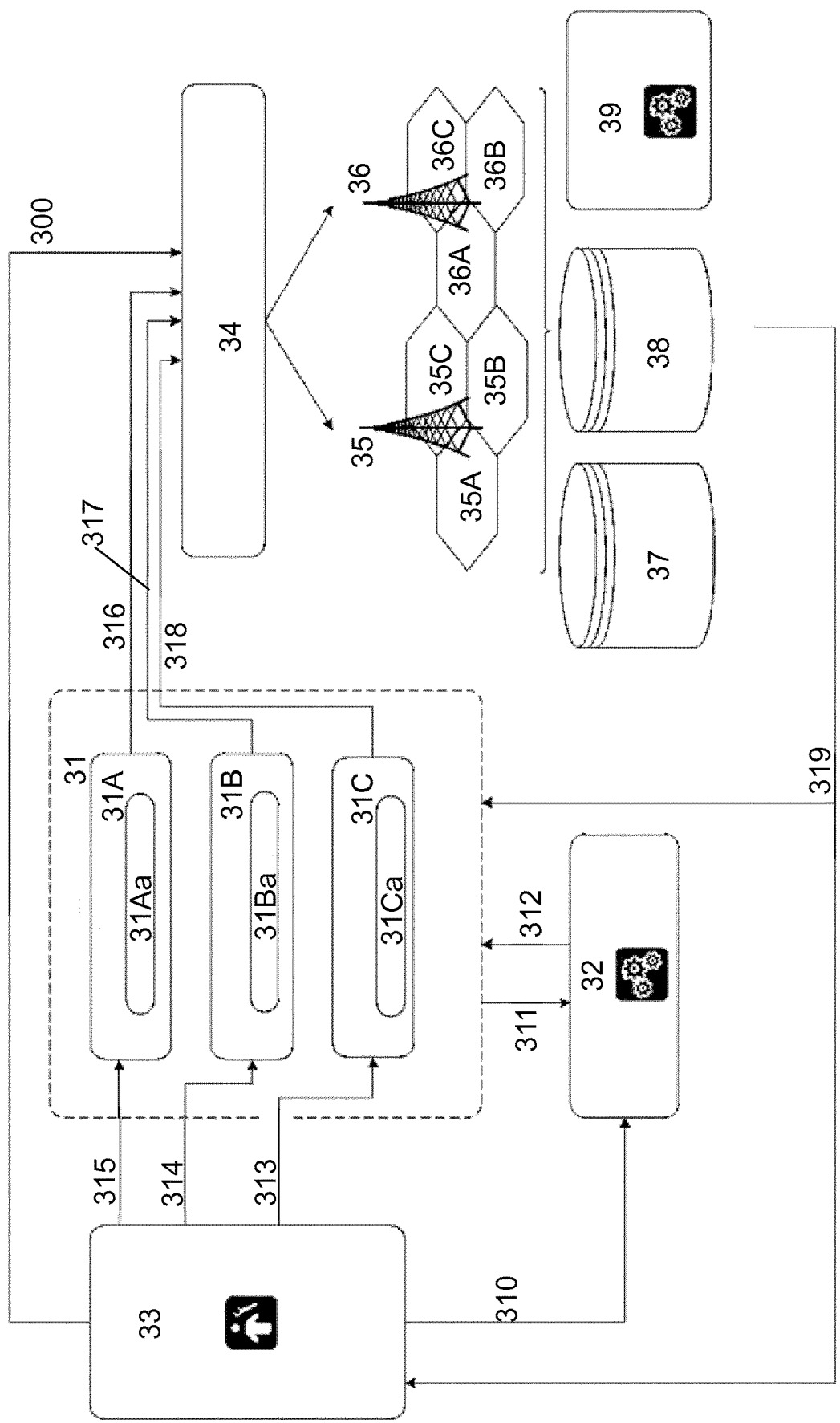
FIG. 3 illustrates a known schematic self-optimizing network system environment.
Figure 4:
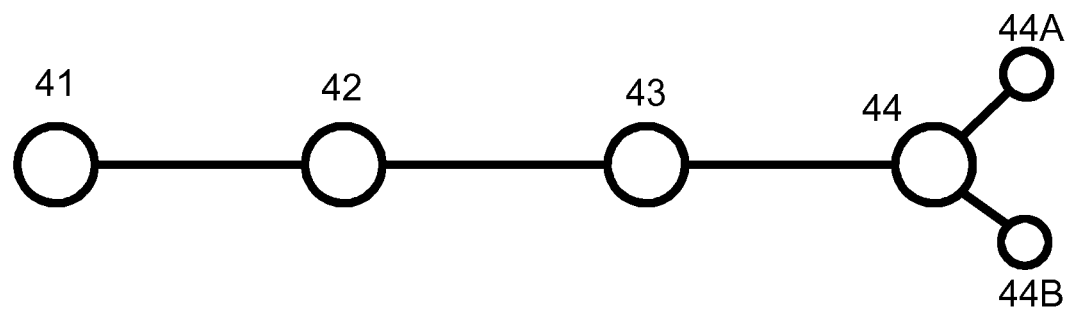
FIG. 4 illustrates a known verification function.

FIG. 2 is a schematic diagram of a procedure according to exemplary embodiments of the present invention.

The system according to FIG. 1 may perform the method of FIG. 2 but is not limited to this method. The method of FIG. 2 may be performed by the system of FIG. 1 but is not limited to being performed by this system.

As shown in FIG. 2, a procedure for post-action verification in a self-organizing network 14 according to exemplary embodiments of the present invention comprises an operation of detecting (S21) a configuration change in a domain, said configuration change comprises at least one parameter change, and said domain comprises at least one cell, an operation of repeating (S22), for a predetermined period, an assessment cycle, and an operation of deciding (S23), for each respective parameter change of said at least one parameter change, whether said respective parameter change is to be undone, based on a performance change of each cell of said domain which cell is affected by said respective parameter change, wherein said assessment cycle (i.e. each assessment cycle) comprises an operation of assessing (S221) said performance change of each cell of said domain which cell is affected by any of said at least one parameter change.

According to a variation of the procedure shown in FIG. 2, exemplary details of the assessment cycle (S22) are given, which are inherently independent from each other as such.

Such exemplary assessment cycle (S22) according to exemplary embodiments of the present invention may comprise an operation of determining an initial performance quantity of each cell of said domain which cell is affected by any of said at least one parameter change, said initial performance quantity being a performance quantity before said configuration change, and an operation of determining an actual performance quantity of each cell of said domain which cell is affected by any of said at least one parameter change, and an operation of calculating, for each cell of said domain which cell is affected by any of said at least one parameter change, a difference between said actual performance quantity and said initial performance quantity as said performance change.

According to a further variation of the procedure shown in FIG. 2, exemplary details of the assessment cycle (S22) are given, which are inherently independent from each other as such.

Such exemplary assessment cycle (S22) according to exemplary embodiments of the present invention may comprise an operation of computing, for each cell of said domain which cell is affected by any of said at least one parameter change, an assessment score, wherein said assessment score is positive, if said performance change is higher than a first threshold, and said assessment score is negative, if said performance change is lower than a second threshold lower than said first threshold, and an operation of accumulating, for each respective parameter change of said at least one parameter change, said assessment score computed for each cell of said domain which cell is affected by said respective parameter change and computed during each assessment cycle of said predetermined period, as an accumulated assessment score, wherein said deciding for each respective parameter change is based on said accumulated assessment score of said respective parameter change.

According to a further variation of the procedure shown in FIG. 2, said assessment score is positive, if said performance change is lower than or equal to said first threshold and higher than or equal to said second threshold and said initial performance quantity is higher than a performance threshold, and said assessment score is negative, if said performance change is lower than or equal to said first threshold and higher than or equal to said second threshold and said initial performance quantity is lower than or equal to said performance threshold.

According to a further variation of the procedure shown in FIG. 2, exemplary details of the assessment cycle (S22) are given, which are inherently independent from each other as such.

Such exemplary assessment cycle (S22) according to exemplary embodiments of the present invention may comprise an operation of transmitting, for each respective parameter change of said at least one parameter change, said assessment score.

According to a further variation of the procedure shown in FIG. 2 said assessment score for a respective parameter change is transmitted to a causer of said respective parameter change.

According to a variation of the procedure shown in FIG. 2, exemplary additional operations are given, which are inherently independent from each other as such. According to such variation, an exemplary method according to exemplary embodiments of the present invention may comprise an operation of receiving at least one of said transmitted assessment scores for a respective parameter change of said at least one parameter change, and an operation of adjusting a configuration change filter based on said received at least one of said assessment scores.

According to a variation of the procedure shown in FIG. 2, exemplary details of the adjusting operation are given, which are inherently independent from each other as such.

Such exemplary adjusting operation according to exemplary embodiments of the present invention may comprise an operation of setting said configuration change filter to forward a received parameter change for which a positive assessment score is received, and an operation of setting said configuration change filter to block a received parameter change for which a negative assessment score is received.

The above-mentioned system and procedure according to exemplary embodiments of the present invention are in the following described in other words with reference to FIGS. 6 to 11.

Namely, to address the problems identified in the known techniques, a scoring method for the verification of configuration actions is proposed according to the present invention.

As outlined above, the present invention may comprise two major components in a network environment, namely a CM change assessor and a scoring listener.

Figure 6:
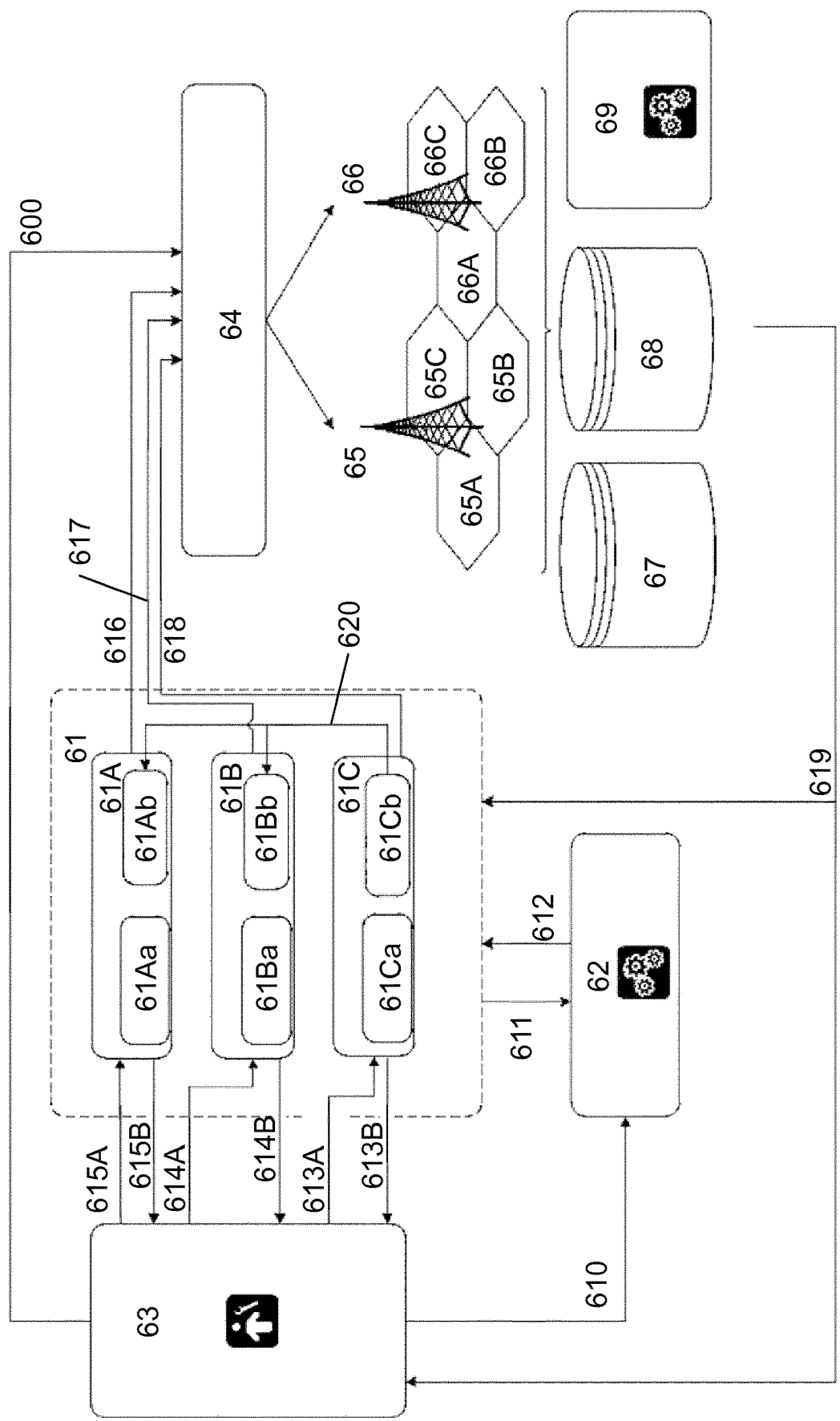
FIG. 6 illustrates a schematic self-optimizing network system environment according to exemplary embodiments of the present invention.

FIG. 6 illustrates a schematic self-organizing network system environment according to exemplary embodiments of the present invention. In particular, FIG. 6 illustrates the placement of a CM change assessor and the (distributed) scoring listeners according to exemplary embodiments of the present invention in a SON-enabled network (though not limiting the implementation of the CM change assessor and scoring listener into a non-SON-enabled network).

As shown in FIG. 6, the CM change assessor 61Cb is integrated into the SON verification function 61C (also implementing a verification algorithm 61Ca), whereas the scoring listener 61Ab, 61Bb is being realized as part of every SON function 61A, 61B of the SON functions 61 that is either at the same or lower level of the SON verification function 61C. Each of the SON functions 61A, 61B implements a respective SON function algorithm 61Aa, 61Ba. Note the term "level" is used here to address the different layers (NE, DM, NM) of the Operation, Administration and Management (OAM) architecture that have been defined in the $3^{rd}$ Generation Partnership Project (3GPP) OAM architecture.

In the following those two components are described in detail. Then an example will be given of how the message flow between those components is realized.

Figure 7:
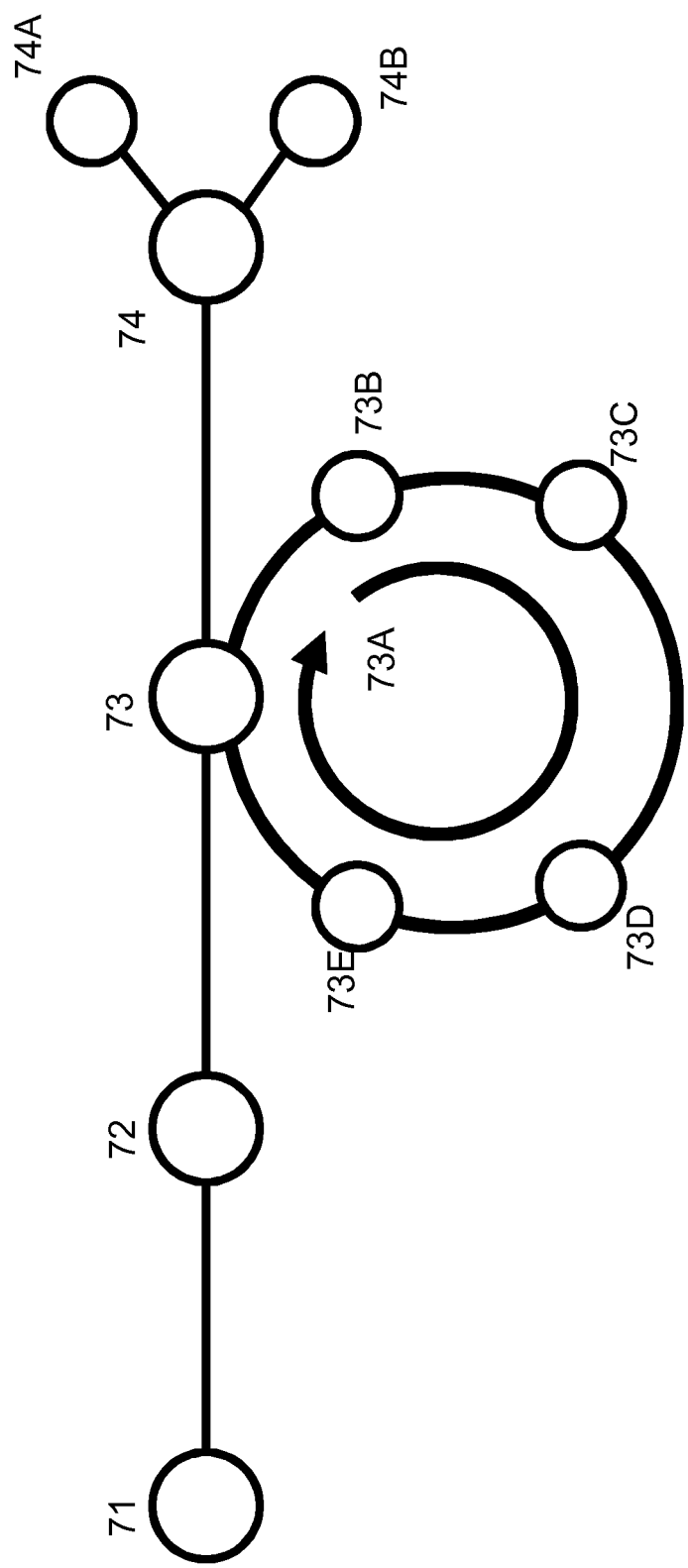
FIG. 7 illustrates a verification function according to exemplary embodiments of the present invention.

The purpose of the CM change assessor 61Cb is to perform performance assessment by using so-called assessment cycles. A single assessment cycle 73A is explained with reference to FIG. 7, illustrating a verification function according to exemplary embodiments of the present invention. Such single assessment cycle consists of the following four steps:

Preparation 73B: Calculate the baseline performance indicator for each cell, which is used as a reference point during the assessment procedure. It represents the performance of the network element before the application of the configuration change.

Score computation 73C: For CM change within a cell a so-called assessment score is given. This is a function of the delta between the actual performance and the baseline performance. Changes having a positive effect on the performance receive positive scores, whereas such causing an anomaly (like degradation in performance) receive negative ones. It should be noted, though, that CM changes may not necessarily have a positive or negative impact, i.e., they are neutral from a performance perspective. Such changes, however, are unnecessary and should be negatively rated if they frequently occur in long term.

Figure 5:
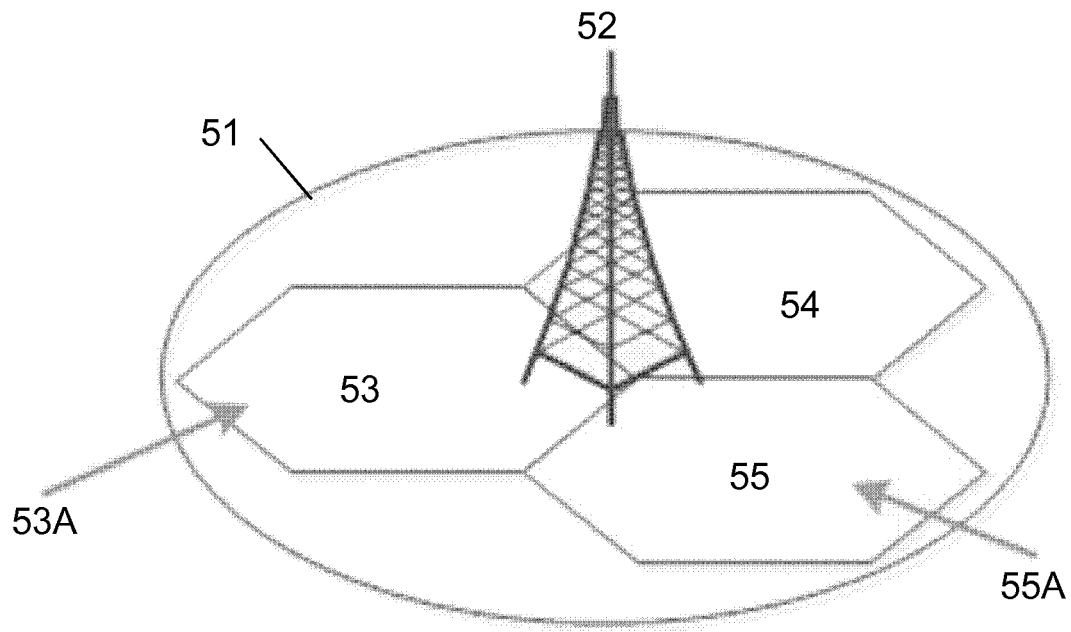
FIG. 5 illustrates an exemplary function area of a self-optimized network function instance.

Score report 73D: the computed scores are reported to the scoring listeners 61Ab, 61Bb of SON function instances 61A, 61B that have triggered the corresponding CM changes. In case of the example given with FIG. 5, SON function instance "A" (whose function area is denoted with 51) will receive scores for both CM changes: CM change "X" (53A) and "Y" (55A).

Assessment decision 73E: The computed score is used to decide (74) if the CM change has passed (74A) or has failed (74B) the actual assessment cycle (73B). CM changes accumulating significant negative scores are undone while CM changes accumulating positive scores are accepted. In case of the example given with FIG. 5, if CM change "X" (53A) continuously causes degradation in performance whereas CM change "Y" (55A) has a positive impact, the first one will get negative scores which will allow SON function "A" (whose function area is denoted with 51) to filter its CM change request by preventing change "X" from occurring again.

The explained assessment cycle 73A according to FIG. 7 is embedded into a verification function according to exemplary embodiments of the present invention.

The verification function comprises of the following phases: a CM change activity observer 71, a verification area generation 72, a performance assessment interval 73 in which the assessment cycles 73A are implemented, as well as a decision (74) to accept (74A, "PASSED") or undo (74B, "FAILED") the CM changes (made by a human operator, a script, a given SON function instance or any other source).

Returning to FIG. 6, if the decision is made to undo the CM changes Undo function CM changes 618 are transmitted to the plan assembly 64.

Returning to FIG. 6, the scoring listener (61Ab, 61Bb) has two major tasks. The first one is to collect the CM change scores (620) computed by the CM change assessor 61Cb (which is part of the verification function 61C). It receives scores, however, only from the verification function 61C that is monitoring its network domain.

Figure 8:
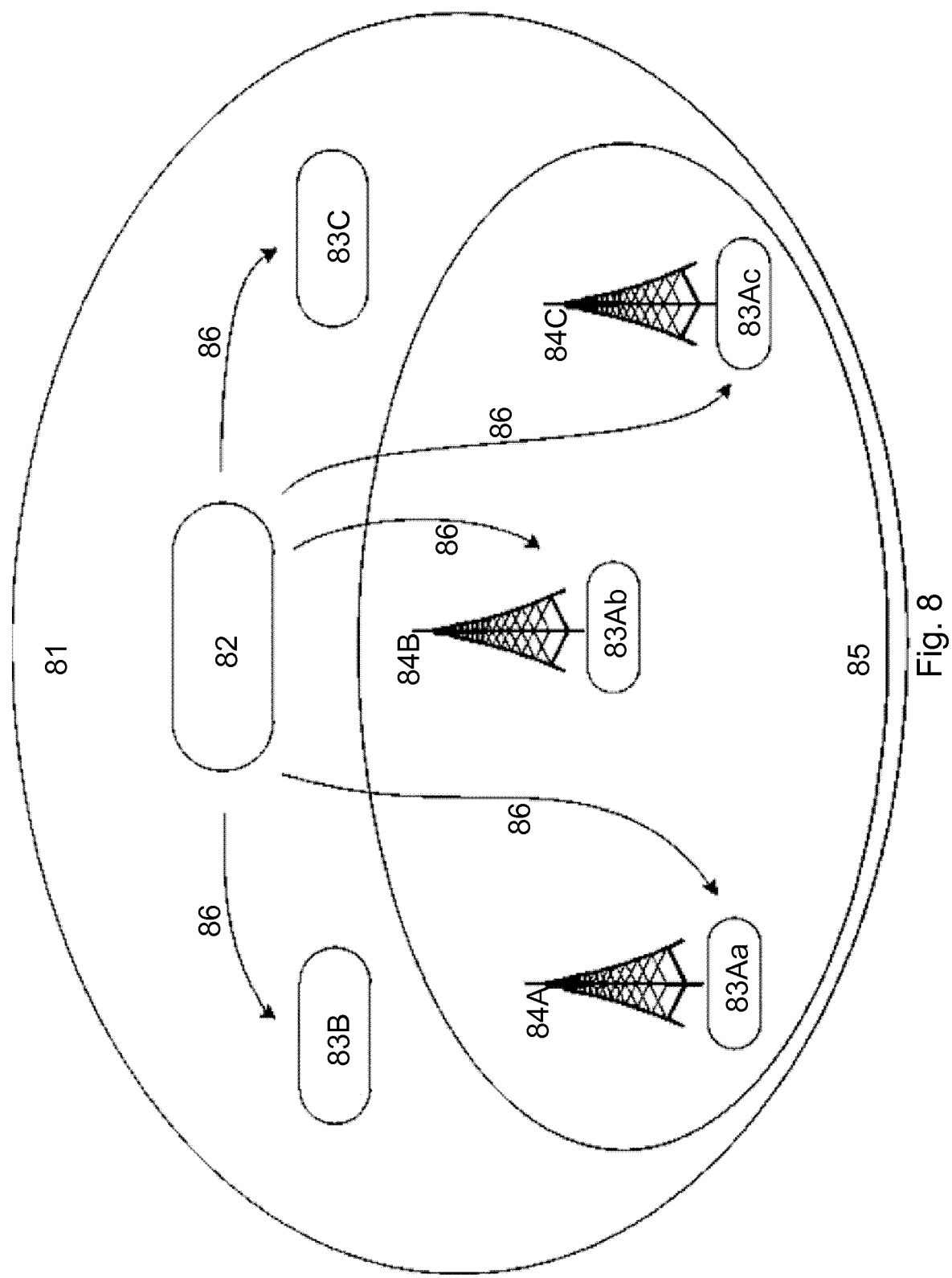
FIG. 8 illustrates a schematic diagram of an example of a self-optimizing network system environment with signaling variants according to exemplary embodiments of the present invention.

An example is given in FIG. 8 illustrating a schematic diagram of an example of a self-organizing network system environment with signaling variants according to exemplary embodiments of the present invention and more particularly showing a message exchange between the CM change assessor and the scoring listener.

According to the exemplary deployment of FIG. 8 the SON verification function 82 is located at the Domain Management (DM) or Network Management (NM) level (NM/DM level 81). Furthermore, according to the exemplary deployment, there are three other SON functions deployed in the network: functions "A" (83A), "B" (83B) and "C" (83C). In addition, let function "A" (83A) have three instances (83Aa, 83Ab, 83Ac respectively served by eNodeB A (84A), eNodeB B (84B) and eNodeB C (84C)) located at the NE level (85) and function "B" (83B) and "C" (83C) have just one instance. Each of the five instances will receive scores (86) from the SON verification function 82 located at this particular domain.

Returning to FIG. 6, the second task of the scoring listener 61A, 61B is to use the scoring results in the function's internal decisions on future CM changes. If implemented independently of the basic algorithm, this means then basically to filter the CM change requests made by a SON function instance. Changes to CM parameters that have received positive scores (for example, because they have improved the performance) are forwarded (Filtered CM configuration A 616, Filtered CM configuration A 617) whereas such having a negative score (i.e., they either "harm" or do not improve the performance) are suppressed.

In addition to the above mentioned entities the SON environment shown in FIG. 6 further comprises the following arrangement.

The SON management 63 may configure the SON functions 61 via respective configurations, e.g., verification function configuration and CM change assessor configuration 613A (causing respective feedback 613B), a function B configuration and scoring listener configuration 614A (causing respective feedback 614B), and a function A configuration and scoring listener configuration 615A (causing respective feedback 615B).

The SON management 63 may further configure the SON coordinator 62 via a coordination configuration 610. The operator is also able to manually adjust (600) CM parameters via the SON management 63.

Filtered CM configurations (e.g. filtered CM configuration A 616 and filtered CM configuration B 617) are transmitted to a plan assembly 64, where the respective configurations are forwarded to and implemented at the respective evolved NodeBs (eNB, eNodeB), e.g., eNodeB A (65) and eNodeB B (66), serving cells 65A to 65C and 66A to 66C, respectively.

Execution requests 611 and execution permissions 612 are interchanged between the SON functions 61 and the SON coordinator 62.

The verification mechanism is implemented as the SON verification function 61C which is seeded with CM, PM and FM data 319 from the corresponding databases (CM database 67, PM database 68) and the FM 69 in order to achieve its task.

It is important to note that the actual source of a configuration change (caused by a SON function, a CM script, an individual command issued by human operator) is not relevant from the perspective of the invention. The only relevance is, in case there is direct feedback back to the source according to the present invention, that the interface to the source is known.

Figure 9:
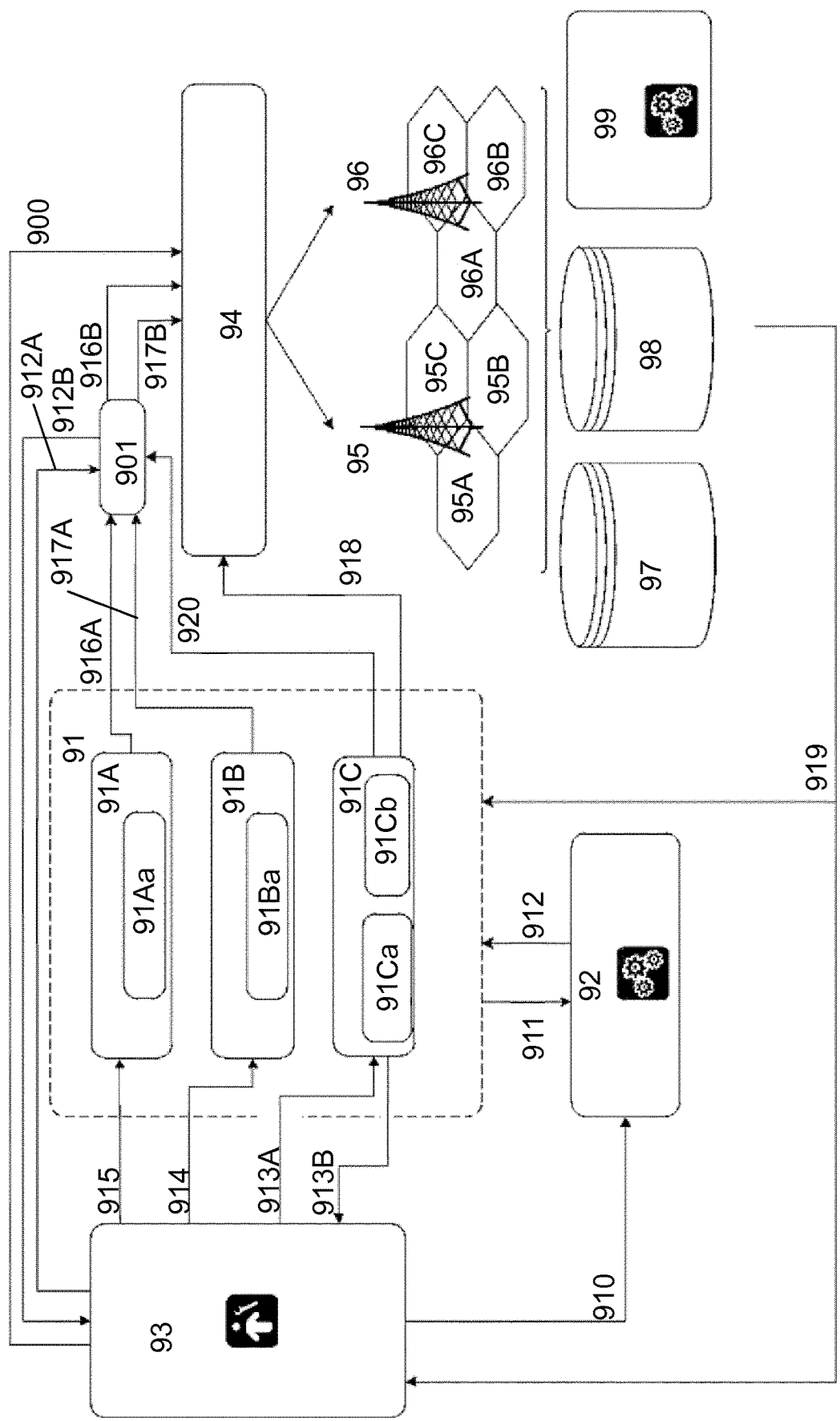
FIG. 9 illustrates a schematic self-optimizing network system environment according to exemplary embodiments of the present invention.

Therefore, an alternative integration of the scoring listener is outlined with reference to FIG. 9. Instead of placing the scoring listener into every SON function (91A, 91B), it may be used as an external component (scoring listener 901) that filters the configuration changes triggered by every SON function 91A, 91B in the network.

The further entities and signals shown in FIG. 9 correspond to those shown in FIG. 6 as follows: 91: 61, 91A: 61A, 91Aa: 61Aa, 91B: 61B, 91Ba: 61Ba, 91C: 61C, 91Ca: 61Ca, 91Cb: 61Cb, 92: 62, 93: 63, 94: 64, 95: 65, 95A: 65A, 95B: 65B, 95C: 65C, 96: 66, 96A: 66A, 96B: 66B, 96C: 66C, 97: 67, 98: 68, 99: 69, 910: 610, 911: 611, 912: 612, 913A: 613A, 913B: 613B, 916B: 616, 917B: 617, 918: 618, 919: 619, 920: 620, and 900: 600, and the description thereof is for this reason omitted.

Further, the SON management 93 may configure the SON functions 91 via respective configurations, e.g., a function B configuration 914, and a function A configuration 915. Furthermore, scoring listener configuration 921A (causing respective feedback 921B) may be transmitted from the SON management 93 to the scoring listener. CM configurations (e.g., CM configuration A 916A and CM configuration B 916B) are transmitted to the scoring listener 901 where the same are filtered as described above.

Figure 10:
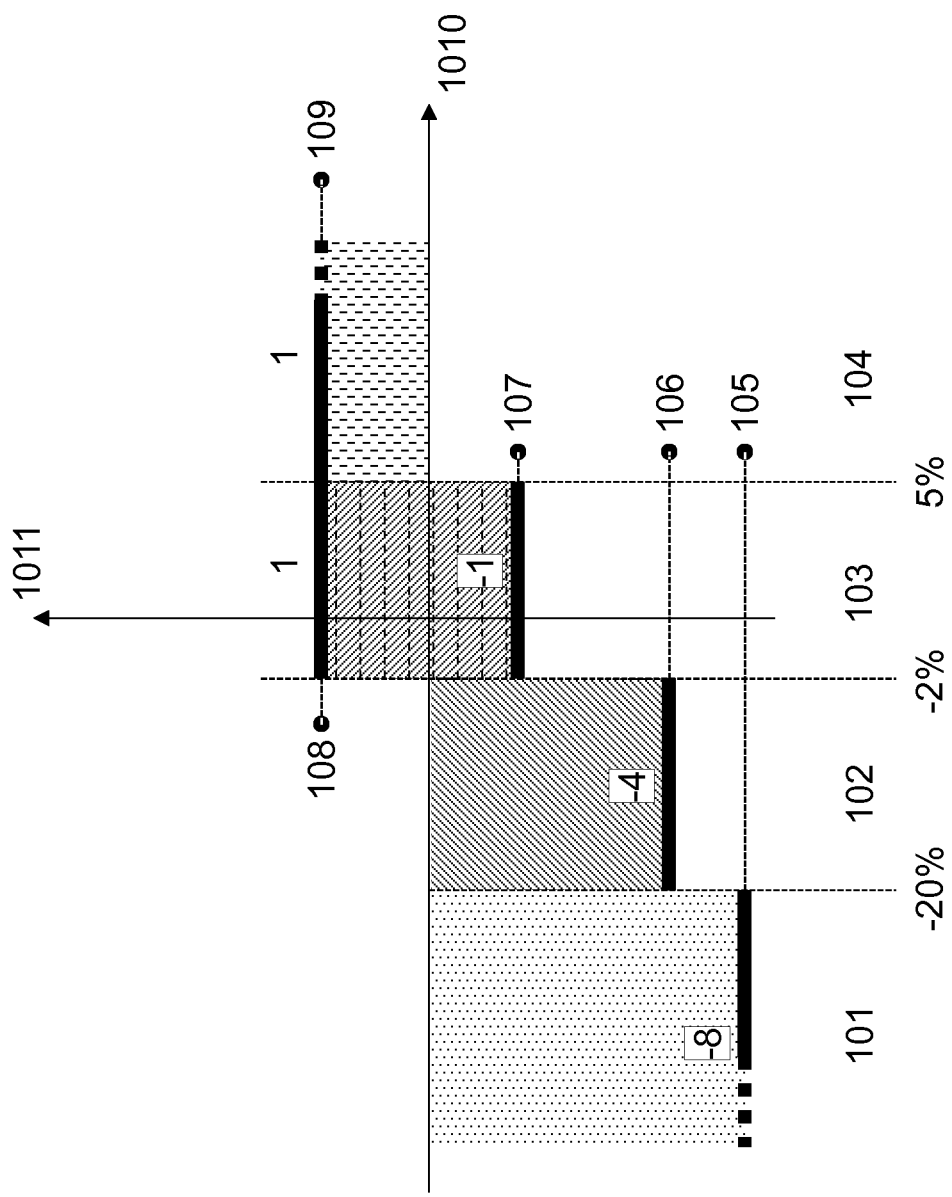
FIG. 10 shows a schematic diagram of a configuration management scoring mechanism according to exemplary embodiments of the present invention.

FIG. 10 shows a schematic diagram of a configuration management scoring mechanism according to exemplary embodiments of the present invention. In other words, a conceptual example of a possible CM scoring mechanism is shown in FIG. 10.

The CM scoring mechanism has four zones. The "green" zone 104 defines the score to give if the cell observes significant performance improvement while the "yellow" 102 and "red" 101 zones define the score if moderate or significant degradation is observed.

The "gray" zone 103 defines the behavior when there is no significant change in the performance. While the scores defined by green 104, yellow 102 and red 101 zones are typically the same for all cells in the scope, the gray 103 zone scores may differ cell by cell.

The goal of the gray zone 103 is to assess situations when there is no significant change in performance. In opposite with the most common assumption, which tells that no change in performance is positive and we should award that, the case is that the judgment of the stalling performance should depend on the level of the stalling performance. If a cell shows good performance (high baseline performance indicator) before the CM change is applied and the performance remains the same after the CM change, then the scoring mechanism should take this into account and award the CM change with positive scores. However, if a cell shows poor performance and the CM change that was applied does not change the situation, i.e., does not improve the performance; it should be punished as ineffective or unnecessary change.

In FIG. 10, 105 denotes the red score, 106 denotes the yellow score, 107 denotes the lowest gray score, 108 denotes the highest gray score, 109 denotes the green score, 1010 denotes the Delta PI (relative difference of the actual PI from the baseline PI), and 1011 denotes the assessment score.

Please note that the colors green, red, yellow and grey are merely assigned for illustrative purposes and are by no means limiting the present invention.

It is further noted that the respective score values (i.e., 1, −1, −4, −8) as well as the respective thresholds (i.e., −20%, −2%, 5%) between the ranges for assigning the scores are examples for illustrative purposes only and are not limited to those values.

In doing so a sub-mechanism is proposed according to exemplary embodiments of the present invention that defines scores in the gray zone 103.

Figure 11:
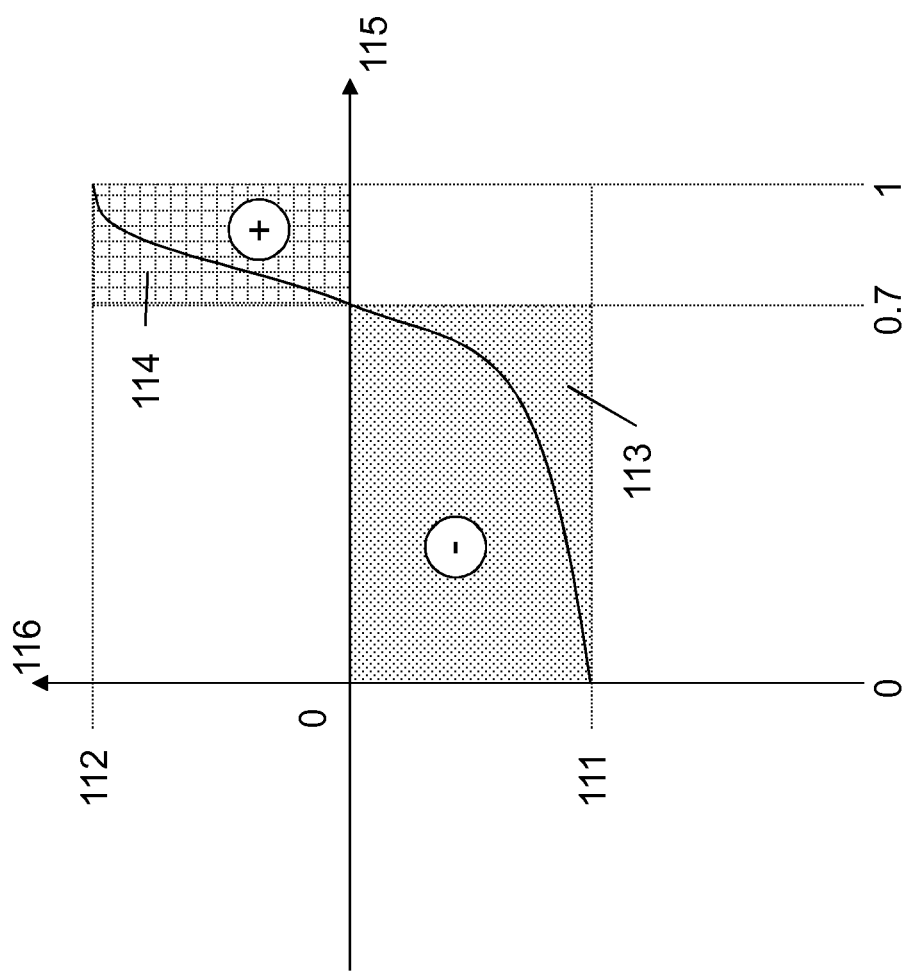
FIG. 11 shows a schematic diagram of a detail of a configuration management scoring mechanism according to exemplary embodiments of the present invention.

FIG. 11 shows a schematic diagram of a detail of a configuration management scoring mechanism according to exemplary embodiments of the present invention as a possible implementation.

The gray zone assessment scores (gray score 116) depend on the absolute value of the baseline performance indicator ($B_{PI}$) 115.

The function according to the present invention has two domains (a first area 113 and a second area 114, as shown in FIG. 11).

As long as the baseline performance indicator is in the acceptable domain, positive gray scores are defined to award CM changes not impairing the performance. On the other hand if the cell shows poor performance and there is no significant performance improvement the CM change is punished with negative gray zone scores.

Furthermore, it should be noted that the gray zone score is defined along with the baseline performance indicator in the preparation phase of the assessment interval (and is static during the assessment interval).

Furthermore, it should be noted that, as the baseline performance indicator might be different for each cell in the scope the final scoring function is also different in the gray zone for each cell.

In FIG. 11, 111 denotes the lowest gray score known from FIG. 10 (107), 112 denotes the highest gray score known from FIG. 10 (108), 113 denotes the first area, in which CM changes that do not degrade the performance of a well performing cell (i.e. with high baseline PI) are awarded, and 114 denotes the second area in which CM changes that do not improve the performance of a bad performing cell (i.e. with low baseline PI) are punished.

It is noted that the respective thresholds (i.e., 0, 0.7, 1) between the ranges for assigning the grey scores are examples for illustrative purposes only and are not limited to those values.

In a the above described system according to exemplary embodiments of the present invention there might be several CM changes even with overlapping scopes under assessment at the same time. In case a cell is in the scope of several CM changes, which were applied at the same time, the given scores are the same, thus, do not need to be computed individually for each CM change. Thus according to exemplary embodiments of the present invention, a score dispatcher functionality is provided that is capable to relay scores to CM changes that share the same score.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the device, i.e., network entity (or some other means) is configured to perform some function, this is to be construed to be equivalent to a description stating that a (i.e., at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e., the expression "unit configured to" is construed to be equivalent to an expression such as "means for").

Figure 12:
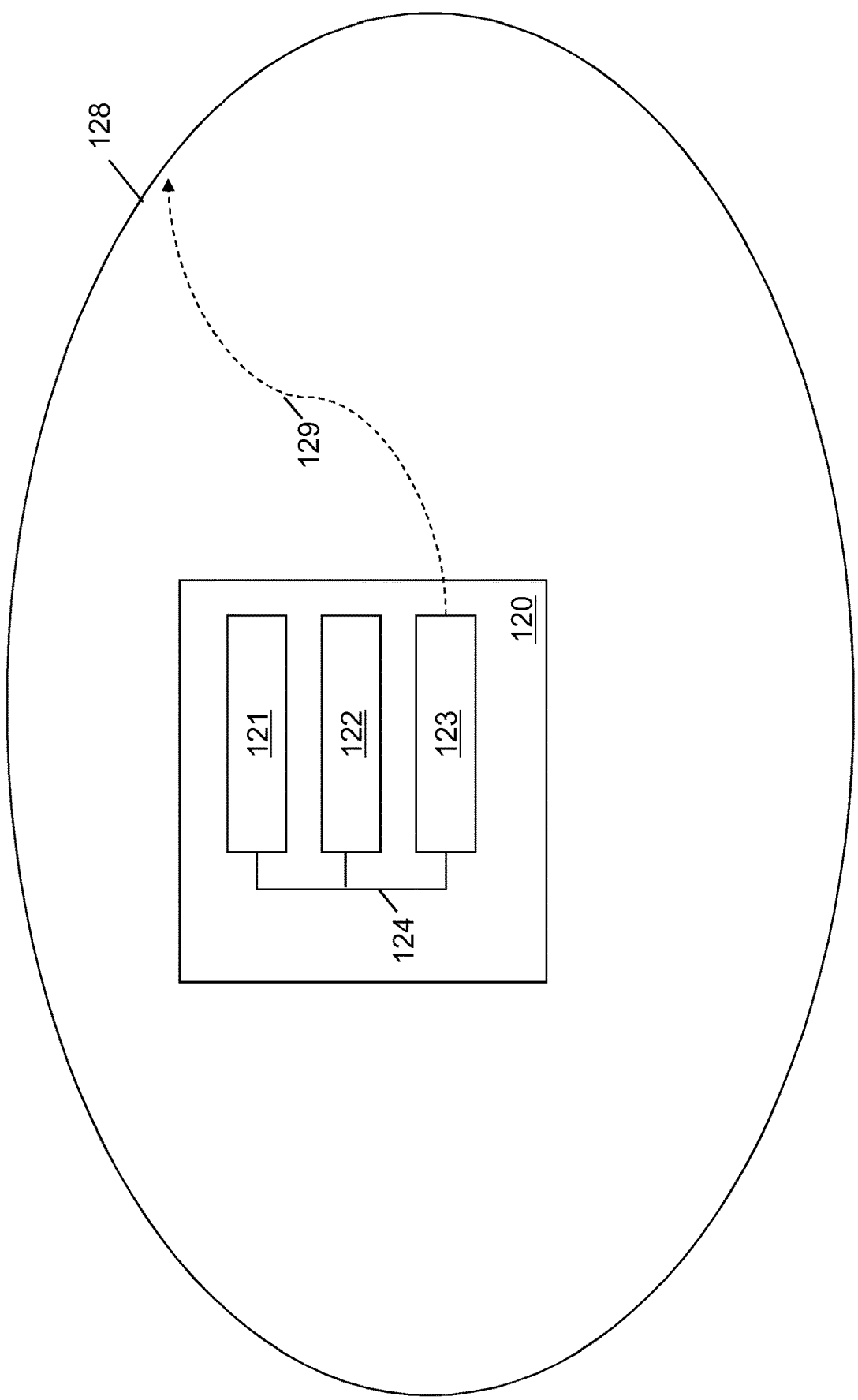
FIG. 12 is a block diagram alternatively illustrating devices according to exemplary embodiments of the present invention.

In FIG. 12, an alternative illustration of devices according to exemplary embodiments of the present invention is depicted. As indicated in FIG. 12, according to exemplary embodiments of the present invention, the device 120 (e.g., corresponding to the devices 10, 13) comprises a processor 121, a memory 122 and an interface 123, which are connected by a bus 124 or the like. The device 120 is connected to the SON 128 and able to communicate with the SON 128 via any communication medium 129.

The processor 121 and/or the interface 123 may also include a modem or the like to facilitate communication over a (hardwire or wireless) link, respectively. The interface 123 may include a suitable transceiver coupled to one or more antennas or communication means for (hardwire or wireless) communications with the linked or connected device(s), respectively. The interface 123 is generally configured to communicate with at least one other apparatus, i.e., the interface thereof.

The memory 122 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

For further details regarding the operability/functionality of the individual apparatuses, reference is made to the above description in connection with any one of FIGS. 1 to 11, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g., the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for verification of configuration actions. Such measures exemplarily comprise detecting a configuration change in a domain, said configuration change comprises at least one parameter change, and said domain comprises at least one cell, repeating, for a predetermined period, an assessment cycle, and deciding, for each respective parameter change of said at least one parameter change, whether said respective parameter change is to be undone, based on a performance change of each cell of said domain which cell is affected by said respective parameter change, wherein said assessment cycle comprises assessing said performance change of each cell of said domain which cell is affected by any of said at least one parameter change.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
BSC base station controller
CCO coverage and capacity optimization
CM configuration management
DM domain management
eNodeB Evolved Node B
FM fault management
KPI key performance indicator
LTE Long Term Evolution
LTE-A Long Term Evolution Advanced
NE network element
NM network management
OAM operation administration and management
PI performance indicator
PM performance management
RNC radio network controller
SON self-organizing network

The invention claimed is:

1. A method for post-action verification in a self-organizing network, comprising
   detecting, by a verification device, a configuration change in a domain initiated by a separate configuration change device, said configuration change comprises at least one parameter change, and said domain comprises at least one cell,
   repeating, for a predetermined period, an assessment cycle, and
   deciding, for each respective parameter change of said at least one parameter change, whether said respective parameter change is to be undone, based on a performance change of each cell of said domain which cell is affected by said respective parameter change,
   wherein each said assessment cycle comprises
   assessing said performance change of each cell of said domain which cell is affected by any of said at least one parameter change by calculating a performance change comprising a difference between an actual performance quantity and an initial performance quantity.

2. The method according to claim 1, wherein said assessment cycle further comprises
   computing, for each cell of said domain which cell is affected by any of said at least one parameter change, an assessment score, wherein said assessment score is positive, if said performance change is higher than a first threshold, and said assessment score is negative, if said performance change is lower than a second threshold lower than said first threshold,
   accumulating, for each respective parameter change of said at least one parameter change, said assessment score computed for each cell of said domain which cell is affected by said respective parameter change and computed during each assessment cycle of said predetermined period, as an accumulated assessment score, wherein
   said deciding for each respective parameter change is based on said accumulated assessment score of said respective parameter change.

3. The method according to claim 2, wherein
   said assessment score is positive, if said performance change is lower than or equal to said first threshold and higher than or equal to said second threshold and said initial performance quantity is higher than a performance threshold, and
   said assessment score is negative, if said performance change is lower than or equal to said first threshold and higher than or equal to said second threshold and said initial performance quantity is lower than or equal to said performance threshold.

4. The method according to claim 1, wherein said assessment cycle further comprises
   transmitting, for each respective parameter change of said at least one parameter change, said assessment score.

5. The method according to claim 4, wherein
   said assessment score for a respective parameter change is transmitted to a causer of said respective parameter change.

6. The method according to claim 4, further comprising
   receiving at least one of said transmitted assessment scores for a respective parameter change of said at least one parameter change, and
   adjusting a configuration change filter based on said received at least one of said assessment scores.

7. The method according to claim 6, wherein
   in relation to said adjusting, said method further comprises
   setting said configuration change filter to forward a received parameter change for which a positive assessment score is received, and
   setting said configuration change filter to block a received parameter change for which a negative assessment score is received.

8. A computer program product embodied on a non-transitory computer-readable medium, said product comprising computer-executable computer program code which, when the program is run on a computer, is configured to cause the computer to carry out the method according to claim 1.

9. A system for post-action verification in a self-organizing network, comprising
   a configuration change device configured to implement a configuration change in a domain, said configuration change comprises at least one parameter change, and said domain comprises at least one cell, and
   a separate verification device including
   a detecting element configured to detect said configuration change,
   an assessing element configured to, for each assessment cycle repeated during a predetermined period, assess a performance change of each cell of said domain which cell is affected by any of said at least one parameter change wherein calculating the performance change comprises determining a difference between an actual performance quantity and an initial performance quantity, and
   a deciding element connected to said assessing element and configured to decide, for each respective parameter change of said at least one parameter change, whether said respective parameter change is to be undone, based on said performance change of each cell of said domain which cell is affected by said respective parameter change.

10. The system according to claim 9, further comprising a coordinator device connected to said verification device, and
   said verification device further comprises a communication element, wherein said communication element is configured to transmit, to said coordinator device, an undo request for undoing a respective parameter change of said at least one parameter change, if it is decided that said respective parameter change is to be undone, said communication element is further configured to receive, from said coordinator device, an undo permission response for undoing said respective parameter change, and wherein said verification device is further configured to implement an undoing of said respective parameter change.

11. The system according to claim 9, further comprising a score listener device connected to said verification device, wherein said verification device is further configured to transmit, for each respective parameter change of said at least one parameter change, an assessment score determined based on said performance change during said assessment cycle repeated for said predetermined period to said score listener device.

12. The system according to claim 11, wherein said score listener device comprises a receiving element configured to receive at least one of said transmitted assessment scores for a respective parameter change of said at least one parameter change, and an adjusting element connected to said receiving element and configured to adjust a configuration change filter based on said received at least one of said assessment scores.

13. The system according to claim 11, wherein said score listener device further comprises a setting element connected to said adjusting element and configured to set said configuration change filter to forward a received parameter change for which a positive assessment score is received, and to set said configuration change filter to block a received parameter change for which a negative assessment score is received.

14. The system according to claim 9, further comprising a management device connected to said configuration change device and to said verification device and configured to manage said configuration change device and said verification device.

15. The system according to claim 9, wherein said configuration change device and said verification device are respectively implemented by a self-optimizing network function.

* * * * *